(12) United States Patent
Uros et al.

(10) Patent No.: US 7,263,927 B2
(45) Date of Patent: Sep. 4, 2007

(54) TWINE DISPENSING ARM OF A BALE WRAPPING ARRANGEMENT OF LARGE ROUND BALER

(75) Inventors: Raymond Uros, Gray (FR); Jerome Simon, Nantilly (FR); Frederic Paillet, Gray (FR); Alain Lucot, Marnay (FR)

(73) Assignee: Deere & Company, Moline, IL (US)

( * ) Notice: Subject to any disclaimer, the term of this patent is extended or adjusted under 35 U.S.C. 154(b) by 3 days.

(21) Appl. No.: 10/884,774

(22) Filed: Jul. 2, 2004

(65) Prior Publication Data

US 2005/0028687 A1 Feb. 10, 2005

(30) Foreign Application Priority Data

Jul. 24, 2003 (DE) .................................. 103 33 592

(51) Int. Cl.
*B65B 13/18* (2006.01)

(52) U.S. Cl. ................ 100/5; 100/13; 56/341

(58) Field of Classification Search .................... 100/5, 100/8, 13, 15, 25, 87, 88, 89; 56/341, 343
See application file for complete search history.

(56) References Cited

U.S. PATENT DOCUMENTS 3,910,178 A * 10/1975 Eggers et al. .................. 100/5
5,215,005 A * 6/1993 Schlotterbeck et al. ........ 100/5

FOREIGN PATENT DOCUMENTS

EP 1 308 080 A2 9/2002
JP 52027000 A * 2/1977

* cited by examiner

*Primary Examiner*—Jimmy Nguyen

(57) ABSTRACT

A twine dispensing arm of a wrapping arrangement for a large round baler is provided with a dispensing end defined by a component which, at the time when twine wrapped about a bale is separated from a length of twine carried by the arm, prevents a length of recoiling twine from becoming entangled or incorrectly oriented for a subsequent wrapping cycle.

3 Claims, 3 Drawing Sheets

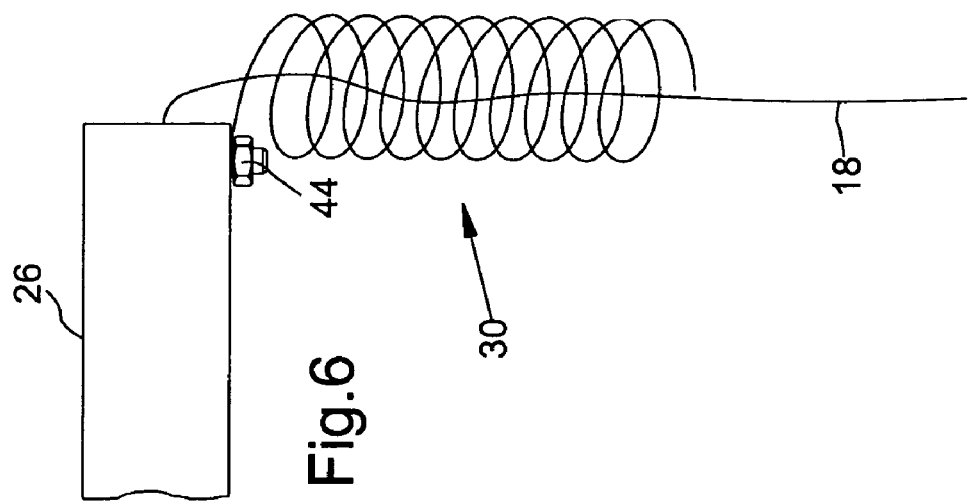
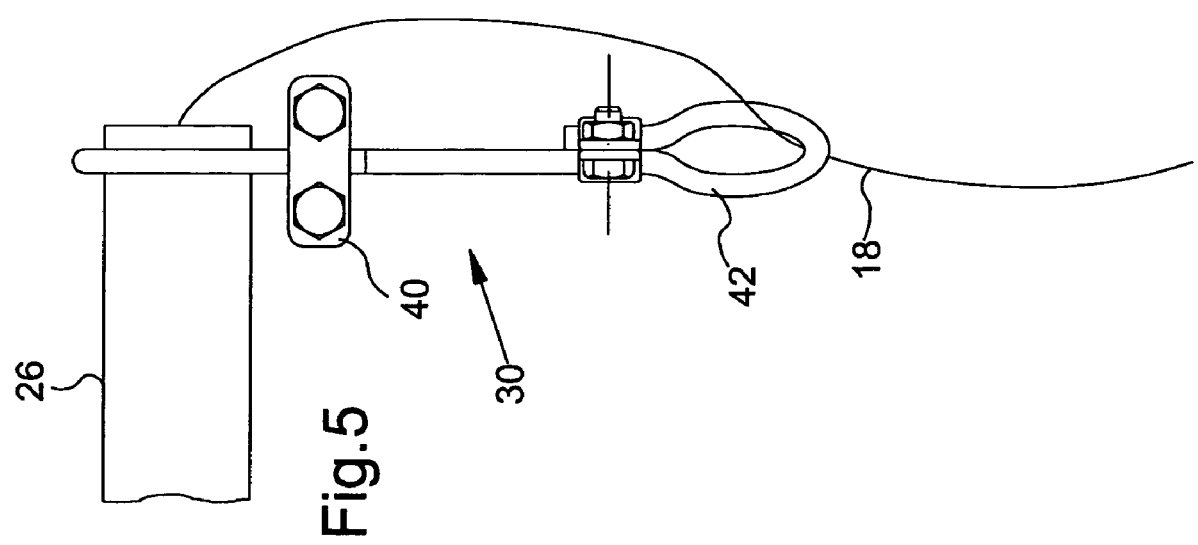

TWINE DISPENSING ARM OF A BALE WRAPPING ARRANGEMENT OF LARGE ROUND BALER

FIELD OF THE INVENTION

The Invention concerns a twine dispensing arm of a wrapping arrangement in a large round baler.

BACKGROUND OF THE INVENTION

EP-A1-1 308 080 discloses a large round baler with a wrapping arrangement, that permits wrapping twine to reach a baling chamber through a slot from above. The wrapping twine is guided by means of a twine dispensing arm to the slot, as soon as the wrapping process is to begin, whereupon a free end section of the wrapping twine hanging downward is carried along by the bale moving in the baling chamber. As soon as the bale is wrapped sufficiently with wrapping twine, the twine is clamped briefly, so that it is drawn into the surface of the cylindrical bale and is subsequently cut. Since the wrapping twine is under high tension immediately before the cut, it recoils after the cut and is thrown upward.

The problem to be solved is seen in the fact that the free end of the wrapping twine wraps itself around the twine dispensing arm after the cutting process on the basis of its inherent elasticity or it takes on a shape bent upward, which finally leads to the fact that the wrapping twine no longer reaches through the slot and the wrapping process is not triggered.

SUMMARY OF THE INVENTION

According to the present invention, there is provided an improved arm for use in a dispensing twine for being wrapped about a large round bale.

An object of the invention is to provide a twine dispensing arm designed so as to avoid the problems associated with the release in tension in twine carried by the arm when the wrapped twine is severed from the length of twine carried by the arm.

This object is accomplished by providing a twine dispensing arm which delivers twine in a downward direction. In this way, the free end section of the wrapping twine is prevented in any case from recoiling upward or from deforming permanently for a part of its length. Here it must be borne in mind that the greatest effect of the force and thereby also the greatest deformation occurs at the exit of the known twine dispensing arm since there the wrapping twine is pulled downward over an edge. Although the length of the guide section is a function of the spacing between the twine dispensing arm and the slot, it should extend over only a part of this spacing, for example, over a quarter of this spacing, so that the section of the wrapping twine can easily enter the slot, and in order that the freedom of movement of the twine dispensing arm is not impaired. The "erect" direction here is understood to be not exactly 90°, but as a direction relative to the slot located under the twine dispensing arm. Obviously, several twine dispensing arms of this type could also be provided, and the wrapping arrangement can be operated with hemp or plastic twine in a baling chamber of fixed size as well as in a baling chamber of variable size. In its simplest form, the twine dispensing arm configured as a tube or a channel is bent downward.

For manufacturing reasons, it may be useful to include an existing part as a tube or a channel, for example, to attach a bow on a tube. On the other hand, a simple plastic bow could be snapped onto a stable steel tube.

If the outlet end of the guide component is elastic, the recoiling wrapping twine experiences a damping effect on its movement; moreover, the end of the wrapping twine is not damaged at sharp edges of the tube or the fitting or the channel. The guide component moves partially with the wrapping twine so that this is not whipped over an edge and recoils upward.

The guide component may be configured as elastic in itself, for example, as an elastic metal component, as a plastic component, rubber component or the like. On the one hand, this elasticity brakes the movement of the wrapping twine and, on the other hand, makes it possible to move the wrapping twine past obstacles, for example, deflectors etc.

A helical tension or compression spring is a commercially available, cost effective component that is provided with a good elasticity as well as good guide characteristics.

A steel spring, in particular, can be configured with a thin spring wire and high pitch, so that no dust and broken crop to be baled is deposited and can impair the running of the wrapping twine. A hose, for example, a water hose of one inch diameter, also offers a cost effective alternative, especially since such a hose can be applied to a known twine dispensing arm and secured by a clamp.

A chain is a further alternative, particularly since it hangs downward due to its weight, can guide the wrapping twine in its links and is sufficiently flexible. A normal link chain can be used, that can deflect in all directions, as well as Gall's chain or a roller chain, such as a bicycle chain, or the like, that can deflect only in one direction. With the latter type of chain, the movement of the wrapping twine can also be controlled.

Another alternative, again, consists of the use of a rope, for example, a stiff steel cable, with a loop, eyelet or the like, in which the wrapping twine is guided without the danger of loss.

The use of a clasp to fasten the rope, the chain or the hose has the advantage that the guide component can easily be attached subsequently as a retrofit to machines already manufactured.

BRIEF DESCRIPTION OF THE DRAWINGS

The drawings show several embodiments of the invention that shall be described in greater detail in the following.

FIG. 5 shows an end of a twine dispensing arm of the wrapping arrangement equipped with a steel cable as a guide component.

FIG. 6 shows an end of a twine dispensing arm of the wrapping arrangement equipped with a spring as a guide component.

DESCRIPTION OF THE PREFERRED EMBODIMENT

Figure 1:
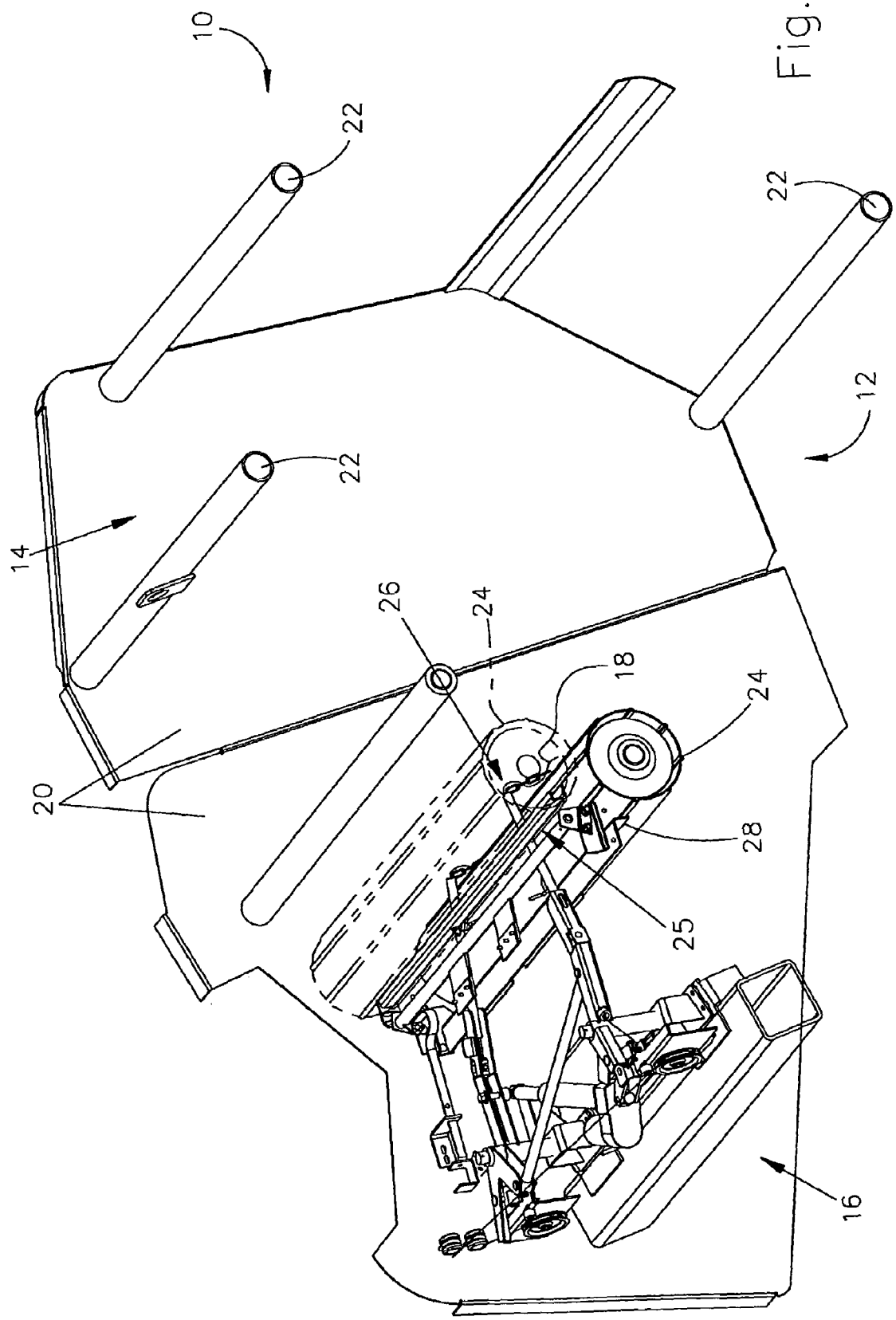
FIG. 1 is a somewhat schematic, left front perspective view showing a portion of a large round baler including a wrapping arrangement constructed in accordance with the principles of the present invention.

Referring now to FIG. 1, there is shown a large round baler including a support 12, a baling chamber 14 and a wrapping arrangement 16.

The larger round baler 10 is used in agriculture or in the trade and is applied for the manufacture of cylindrical bales which are wrapped at the end of the baling process with wrapping twine 18 and are thereby held together. Large round balers are known in themselves sufficiently, for example, as part of the model series John Deere 575 so that details need not be described here.

The support 12 is composed of a chassis, a tow bar and the like, but is represented in the drawing by side walls, 20, that enclose the baling chamber 14 at its ends. The walls 20 are connected by struts 22 with corresponding walls on the other side, so that the baling chamber 14 is configured as a stable structure. The wrapping arrangement 16 is also retained between the walls 20 and around its circumference by rolls 24, of which only two of are shown. Nearly twenty of such rolls 24 extend in the direction of the struts 22 and are arranged in a circular pattern that permits a first, lower gap or slot for the inlet of the crop to be baled and a second, upper gap or slot 25 for the inlet of wrapping twine 18 in each case into the baling chamber 14. In the present embodiment, the baling chamber 14 is configured as fixed in its size, but this is not mandatory. Rather, the baling chamber 14 could be of variable size and/or be enclosed by belts and/or bar chains. In the baling chamber 14, a bale, not shown, is maintained in constant rotation, so that at the end of the baling process wrapping twine 18 is introduced between the rolls 24 and is grasped by the bale and carried along.

The wrapping arrangement 16 provides the supply of the wrapping twine 18 into the baling chamber 14, its sideways guidance on the circumferential surface of the rotating cylindrical bale and its separation as soon as it has been wrapped around the bale with wrapping twine 18, all of this is sufficiently known and shall therefore be described only to the extent that this is necessary for the understanding of the present invention. In the present embodiment the wrapping arrangement 16 contains two twine dispensing arms 26, that insert wrapping twine into the baling chamber 14 from above the roll 24, as pictured. Instead only a single twine dispensing arm 26 could be provided. Each twine dispensing arm 26 can assume three positions, namely, a rest position, a wrapping starting position and a cutting position into each of which it is guided by a motor.

In the rest position, the twine dispensing arm 26 extends approximately parallel to the longitudinal direction of the rolls 24. In the wrapping starting position, that corresponds to the position shown in FIG. 1, the wrapping twine 18 is guided into the upper slot 25 between the rolls 24 so that it drops downward into the baling chamber 14 and is grasped there by the rotating cylindrical bale and is carried along. It is important that the wrapping twine 18 hangs downward far enough so that it can be grasped. Therefore the free end of the wrapping twine 18 hanging downward must not be bent or become entangled with the twine dispensing arm 26. In the cutting position, the twine dispensing arms 26 extend approximately perpendicular to the longitudinal axis of the rolls 24 and are in an operating position with the cutting arrangement 28. In this position, the wrapping twine 18 is held fast so that it is in contact with the circumferential surface of the cylindrical bale under increased tension, and is subsequently torn off or cut off. Due to the high tension, the cut end section tends to recoil and to move uncontrollably.

The twine dispensing arm 26 is provided with a guide component 30 that guides the wrapping twine 18 over part of its length and thereby prevents it from performing an uncontrolled movement that can lead to it not reaching the slot 25 in the baling chamber 14. Although this danger is greatest with a twine dispensing arm 26 extending horizontally or generally in the horizontal direction, the guide component 30 can also be helpful with a more erect arrangement of the twine dispensing arm 26.

Regarding the configuration of the guide component 30, reference is made to FIGS. 2 through 6, each of which shows the otherwise free section of the twine dispensing arm 26 with guide component 30 in an end section of the wrapping twine 18.

Figure 2:
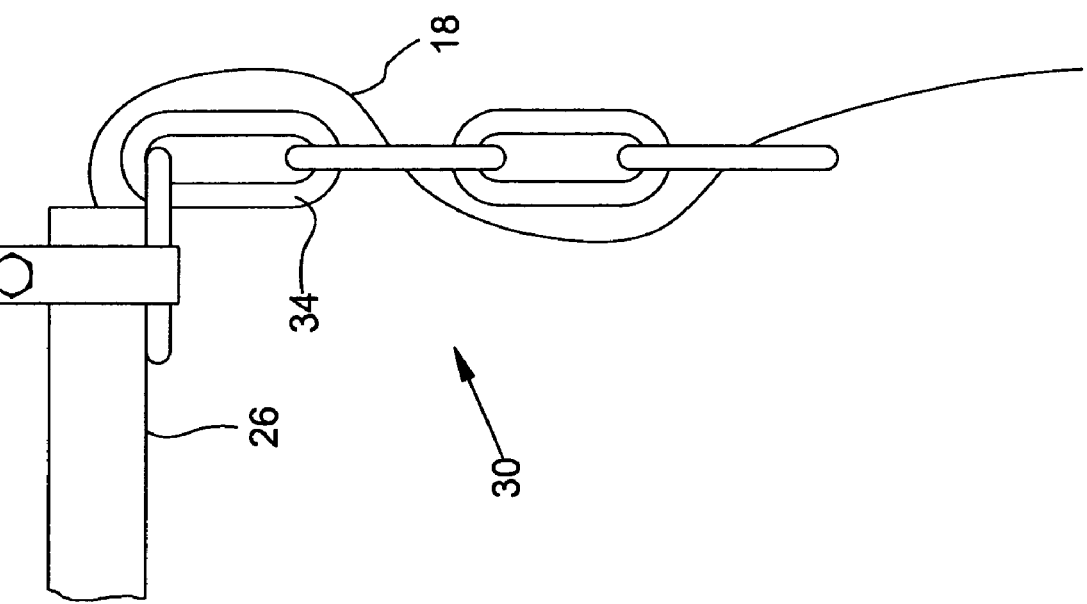
FIG. 2 shows an end of a twine dispensing arm of the wrapping arrangement equipped with a chain as a guide component.

According to FIG. 2, the guide component 30 is configured as a link chain that is attached to the underside of the tube-shaped twine dispensing arm 26 by a clasp 32. In this case, the guide component 30 contains five links 34 of which the first, upper link is clamped between the clasp 32 and the twine dispensing arm 26 and the remaining four links hang downward. The wrapping twine 18 is threaded through the lower links 34 so that the wrapping twine 18 is caught during the recoiling after the cutting process and cannot wrap itself around the twine dispensing arm 26, for to do so it would have to carry along the guide component 30, that is, the heavy chain.

Figure 3:
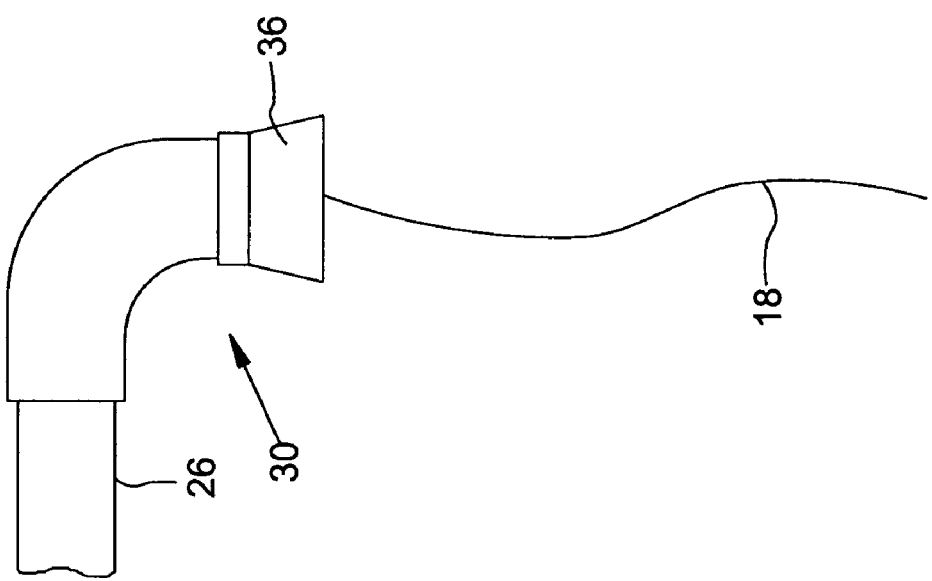
FIG. 3 shows an end of a twine dispensing arm of the wrapping arrangement equipped with an elastic collar as a guide component.

According to FIG. 3, the guide component 30 is configured as a bow, that extends downward and is provided at its lower end with a flexible collar 36. The bow may consist of metal or plastic and be attached with screws, clamped or snapped in place or attached with adhesive.

Figure 4:
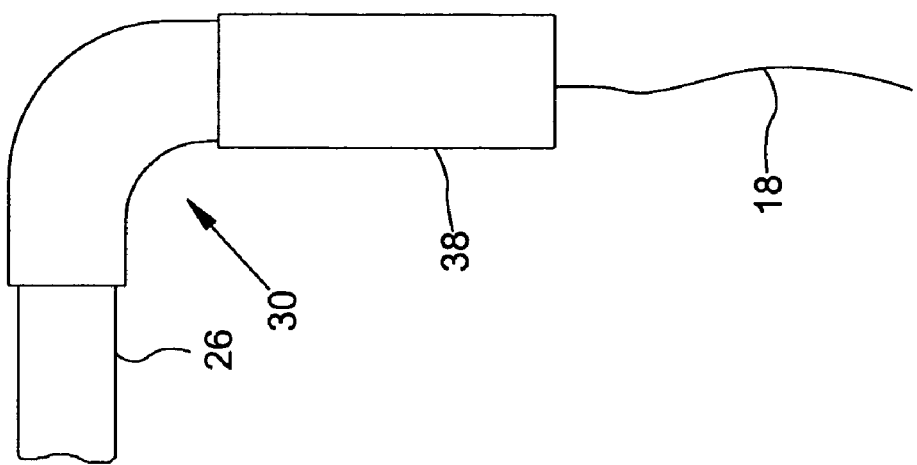
FIG. 4 shows an end of a twine dispensing arm of the wrapping arrangement equipped with a hose as a guide component.

The solution according to FIG. 4 differs from that according to FIG. 3 in that in place of the collar 36, a hose 38 is snapped on. The hose 38 can be fastened with a clasp or a clamp, no shown, by means of adhesive or in some other manner. Depending on the energy of the wrapping twine 18 that can be expected during its upward recoiling, the hose 38 should be supported by steel inserts or otherwise configured sufficiently stiff. Basically, a water hose of one inch diameter could be appropriate.

FIG. 5 reveals a variation in which a plastic-coated steel cable is fastened at the upper end y means of a cable clamp 40 to the free end of the twine dispensing arm 26 and is provided with a loop 42 at its lower end through which the wrapping twine 18 extends.

Finally, FIG. 6 shows an embodiment in which a helical spring is used as a guide component 30. This guide component 30 is fastened to the twine dispensing arm 26 by means of a carriage bolt 44.

All embodiments have in common that the guide component 30 extends only over a part of the length of the wrapping twine 18 hanging downward, for example, over a quarter of its length.

Having described the preferred embodiment, it will become apparent that various modifications can be made without departing from the scope of the invention as defined in the accompanying claims.

The invention claimed is:

1. In a wrapping arrangement for introducing twine into a baling chamber of a large round baler to be wrapped about a bale rotating there, said wrapping arrangement including a twine delivery arm mounted for movement to a wrapping position said twine delivery arm having a delivery end from which said twine is guided into a slot between rolls of the baler during a wrapping process so that a twine end drops downward into the baling chamber and is grasped there by the rotating bale, the improvement comprising: said delivery end of said arm having an upright guide component fastened thereto, said upright guide component comprising a flexible helical spring through which said twine is conducted, said helical spring having an end fastened to the delivery end of said arm, a length of the upright guide component being a function of a spacing between the twine delivery arm and the slot and said length extending over a quarter of the spacing, so that the wrapping twine can easily enter the slot and the freedom of movement of the twine delivery arm is not impaired.

2. The wrapping arrangement, as defined in claim 1, wherein said helical spring being fastened to said delivery end of said arm by a bolt.

3. The wrapping arrangement, as defined in claim 1, wherein said helical spring is configured with a thin spring wire and high pitch, so that no dust and broken crop to be baled is deposited therein to impair running of the wrapping twine.

* * * * *